US008130641B2

(12) United States Patent
Wong et al.

(10) Patent No.: US 8,130,641 B2
(45) Date of Patent: Mar. 6, 2012

(54) METHODS AND SYSTEMS FOR MANAGING NETWORK TRAFFIC WITHIN A VIRTUAL NETWORK SYSTEM (75) Inventors: Patrick Choy Ming Wong, Roseville, CA (US); Scott Robert Koster, Roseville, CA (US); Michael Todd, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 174 days.

(21) Appl. No.: 12/403,466

(22) Filed: Mar. 13, 2009

(65) Prior Publication Data
US 2010/0232290 A1 Sep. 16, 2010

(51) Int. Cl.
*H04L 12/26* (2006.01)
(52) U.S. Cl. ........................................ 370/229; 370/235
(58) Field of Classification Search .......... 370/229–235, 370/254; 709/223–226
See application file for complete search history.

(56) References Cited

U.S. PATENT DOCUMENTS

| 7,818,452 | B2 * | 10/2010 | Matthews et al. ............. 709/238 |
| 2010/0027420 | A1 * | 2/2010 | Smith ........................... 370/235 |
| 2010/0214949 | A1 * | 8/2010 | Smith et al. ................... 370/254 |
| 2010/0275199 | A1 * | 10/2010 | Smith et al. ....................... 718/1 |

\* cited by examiner

*Primary Examiner* — Gary Mui (57) ABSTRACT

Methods, systems and computer readable mediums storing computer executable programs for managing network traffic within a virtual network system. A virtual network system defined within a physical network device is identified. A first virtual network device defined within the virtual network system is identified. A virtual network appliance within the physical network device is defined. The virtual network appliance is communicatively coupled to the first virtual network device. The virtual network appliance is communicatively coupled to the virtual network system. The virtual network appliance is operable to manage network traffic associated with the first virtual network device.

14 Claims, 4 Drawing Sheets

METHODS AND SYSTEMS FOR MANAGING NETWORK TRAFFIC WITHIN A VIRTUAL NETWORK SYSTEM

FIELD OF THE INVENTION

The present invention generally relates to network management and more particularly to managing network traffic associated with one or more virtual network devices within a virtual network system.

BACKGROUND OF THE INVENTION

Virtualization is a process used to define a virtual infrastructure or a virtual network system within a physical device or a physical machine. Examples of physical devices include a computer or a server. Virtualization enables the use of a single physical resource to create multiple virtual resources or multiple virtual machines within the single physical resource. The multiple virtual resources typically share the physical resources available to the physical resource.

Prior art virtualization software packages typically provide the ability to define virtual network systems with a plurality of virtual network devices. However, such prior art virtualization software often provide limited capabilities with respect to defining interconnections between the virtual network devices within the virtual network system. Furthermore, prior art visualization software packages typically do not provide the option of integrating virtual network appliances with the ability to manage network traffic within the virtual network system.

SUMMARY OF THE INVENTION

One aspect of the invention is directed to a method of managing network traffic within a virtual network system. A virtual network system defined within a physical network device is identified. A first virtual network device defined within the virtual network system is identified. A virtual network appliance within the physical network device is defined. The virtual network appliance is communicatively coupled to the first virtual network device. The virtual network appliance is communicatively coupled to the virtual network system. The virtual network appliance is operable to manage network traffic associated with the first virtual network device.

Another aspect of the invention is directed to computer readable medium for storing a computer executable program for managing network traffic within a virtual network system. Yet another aspect of the invention is directed to a system for managing network traffic within a virtual network system.

DETAILED DESCRIPTION OF THE DRAWINGS

Figure 1:
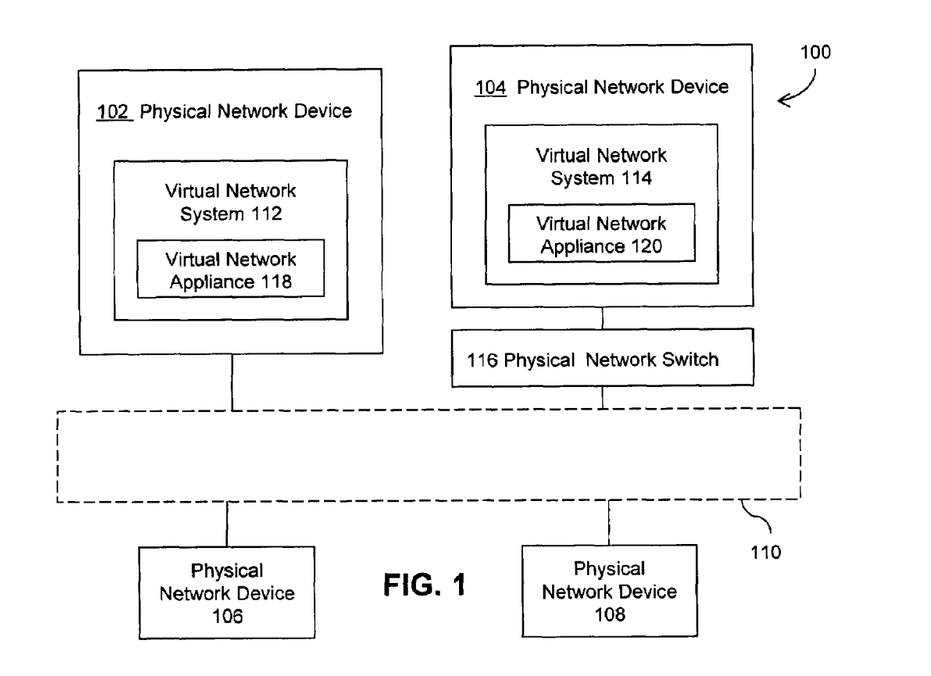
FIG. 1 is a block diagram representation of an example of a network system where one embodiment of managing network traffic associated with one or more virtual network devices may be implemented.

Referring to FIG. 1, a block diagram representation of an example of a network system 100 where one embodiment of managing network traffic associated with one or more virtual network devices may be implemented is shown. The network system 100 includes first, second, third and fourth physical network devices 102, 104, 106, 108 communicatively coupled to each other via a physical network 110. Examples of physical network devices 102, 104, 106, 108 include but are not limited to physical servers, physical computer systems, physical mainframe systems, physical clusters and physical blades. In one embodiment, communicative coupling between the physical network devices 102, 104, 106, 108 is established via a networking infrastructure. In one embodiment, communicative coupling between the physical network devices 102, 104, 106, 108 is established via an Internet network. In one embodiment, communicative coupling between the physical network devices 102, 104, 106, 108 is established via a wireless communication system. In one embodiment, communicative coupling between the physical network devices 102, 104, 106, 108 is established via a wired communication system. In one embodiment, communicative coupling between the physical network devices 102, 104, 106, 108 is established via a combination of one or more of the communication systems described above.

First and second virtual network systems 112, 114 are defined in first and second physical network devices 102, 104, respectively. The first virtual network system 112 is communicatively coupled to the physical network 110 via the first physical network device 102. The second virtual network system 114 is communicatively coupled to the physical network 110 via the second physical network device 104 and a physical network switch 116.

The first and second virtual network systems 112, 114 generally include one or more virtual network devices and one or more virtual network appliances 116, 118. In the example network system 100, the first and second virtual network systems 112, 114 include first and second virtual network appliances 118, 120, respectively. Examples of virtual network appliances include but are not limited to a virtual network traffic router, a virtual network switch, a virtual network access point device, a virtual network security appliance and a virtual wide area network accelerator. Examples of virtual network security appliances include, but are not limited to, a virtual firewall network security appliance and a virtual intrusion prevention network security appliance.

The virtual network appliances 118, 120 generally manage network traffic association with one or more of the virtual network devices within the virtual network system 112, 114. In one embodiment, the virtual network appliance operates to enforce network policies within the virtual network system 112, 114. Examples of network management operations performed by the virtual network appliance 118, 120 include, but are not limited to access control operations, network management operations, network traffic monitoring operations, network reporting operations, a network traffic routing operations, network throttling operations, network quality service operations, network load balancing operations, network traffic filtering operations, network traffic restriction operations, network deep packet inspection operations, network access control list implementation operations, network protocol filtering operations and network media access control (MAC) address filtering operations.

In one embodiment, the virtual network appliance 118, 120 manages network traffic associated with one or more selected virtual network devices within the virtual network system 112, 114. In one embodiment, the virtual network appliance 118, 120 manages all network traffic associated with all of the virtual network devices within the virtual network system 112, 114.

In one embodiment, the virtual network appliance 118, 120 manages all network traffic to one or more virtual network devices within the virtual network system 112, 114. In one embodiment, the virtual network appliance 118, 120 manages all network traffic from one or more virtual network devices within the virtual network system 112, 114. In one embodiment, the virtual network appliance 118, 120 manages all network traffic to and from one or more virtual network devices within the virtual network system 112, 114.

In one embodiment, the virtual network appliance 118, 120 manages selected network traffic to one or more virtual network devices within the virtual network system 112, 114. In one embodiment, the virtual network appliance 118, 120 manages selected network traffic from one or more virtual network devices within the virtual network system 112, 114. In one embodiment, a virtual network appliance 118, 120 manages selected network traffic to and from one or more virtual network devices within the virtual network system 112, 114.

Figure 2:
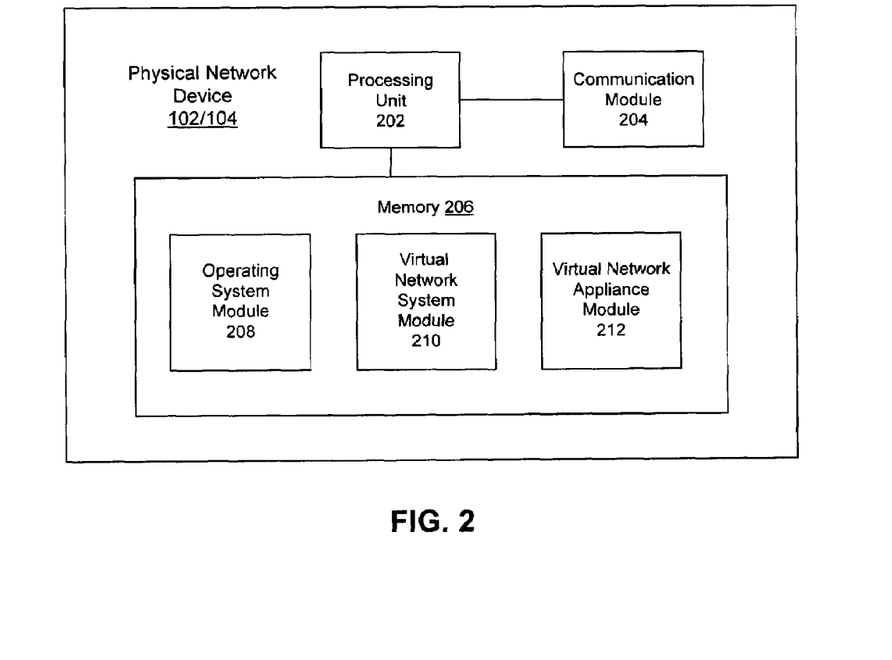
FIG. 2 is a block diagram representation of an example of a physical network device that may be used to implement one embodiment of managing network traffic associated with one or more virtual network devices.

It should be noted that while an example of a network system 100 including four physical network devices 102, 104, 106, 108 and two virtual network systems 112, 114 defined within two of the physical network devices 102, 104 has been described, network systems having alternate configurations may be used to implement managing network traffic associated with one or more virtual network FIG. 2 is a block diagram representation of an example of a physical network device that may be used to implement one embodiment of managing network traffic associated with one or more virtual network devices.

Furthermore, the term physical network device 102, 104 is also used in the present application to refer to physical standalone devices. A physical standalone device may include one or more virtual network systems 112, 114. In one embodiment, the virtual network appliance 118, 120 operates to manage network traffic associated with one or more virtual network devices defined within the virtual network system 112, 114. In one embodiment, the virtual network appliance 118, 120 operates to manage network traffic within the virtual network system 112, 114 Referring to FIG. 2, a block diagram representation of an example of a physical network device 102, 104 that may be used to implement one embodiment of managing network traffic associated with one or more virtual network devices is shown. The physical network device 102, 104 generally includes a processing unit 202, a communication module 204 and a memory 206. The processing unit 202 includes a processor or controller. The communication module 204 facilitates communications between the physical network device 102, 104 and other devices.

In one embodiment, the communication module 204 supports communication via a networking infrastructure. In one embodiment, the communication module 204 supports communication via the Internet. In one embodiment, the communication module 204 supports wireless communication. In one embodiment, the communication module 204 supports wired communication. In one embodiment, the communicative module 204 supports communications via a combination of one or more of the communication systems described above.

In one embodiment, an operating system module 208, a virtual network system module 210 and a virtual network appliance module 212 are stored in the memory 206. The virtual network system module 210 is generally used to define one or more virtual network devices and their inter-relationships within a virtual network system 112, 114. In one embodiment the virtual network system module 210 used to define the virtual network devices and their inter-relationships within the virtual network system 112, 114 is a third party virtualization software module. Examples of third party virtualization software modules include, but are not limited to VMware Server®, VMware ESX®, Microsoft Virtual Server®, Microsoft Windows Server 2008 HyperV®, Parallels Server® and Zen® virtual server applications.

The virtual network appliance module 212 generally processes commands associated with defining and integrating one or more virtual network appliances 112, 114 into a virtual network system 112, 114. In one embodiment, the virtual network appliance module 212 processes commands associated with defining and integrating one or more virtual network appliances 112, 114 into a virtual network system 112, 114 previously defined using a virtual network system module 210. In one embodiment, the virtual network appliance module 212 integrates one or more virtual network appliances 112, 114 into a virtual network system 112, 114 previously defined using a virtual network system module 210 without making any modifications to the virtual network system module 210.

In one embodiment, the memory 206 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 202 generally retrieves and executes machine readable instructions or software programs that are stored in the memory 206.

While a number of different components and modules have been described, the physical network device 102, 104 may include additional components and/or modules that facilitate the operation of the physical network device 102, 104 and/or the operation of the virtual network appliance module 212.

Figure 3:
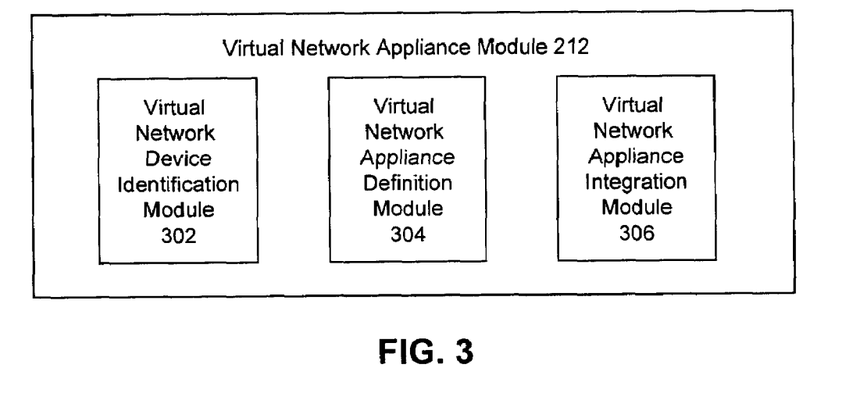
FIG. 3 is a block diagram representation of one embodiment of a virtual network appliance module.

Referring to FIG. 3 a block diagram representation of one embodiment of a virtual network appliance module 212 is shown. The virtual network appliance module 212 generally processes commands associated with defining and integrating one or more virtual network appliances 112, 114 into a virtual network system 112, 114. In one embodiment, the virtual network appliance module 212 includes a virtual network device identification module 302, a virtual network appliance definition module 304 and a virtual network appliance integration module 306.

The virtual network device identification module 302 generally processes commands associated with identifying virtual network systems 112, 114 and virtual network devices within a physical network device 102, 104. In one embodiment, if there is a single virtual network system 112, 114 defined within the physical network device 102, 104, virtual network device identification module 302 identifies the virtual network system 112, 114 defined within the physical network device 102, 104. In one embodiment, if there are a multiple virtual network systems 112, 114 within a single physical network device 102, 104, the virtual network device identification module 302 identifies all of the virtual network systems 112, 114 within a physical network system 102, 104 and provides a user with the option of selecting a specific virtual network system 112, 114 for modification. Once the virtual network device identification module 302 has identified a specific virtual network system 112, 114 for modification, the virtual network device identification module 302 identifies all virtual network devices defined within the identified virtual network system 112, 114.

Figure 4:
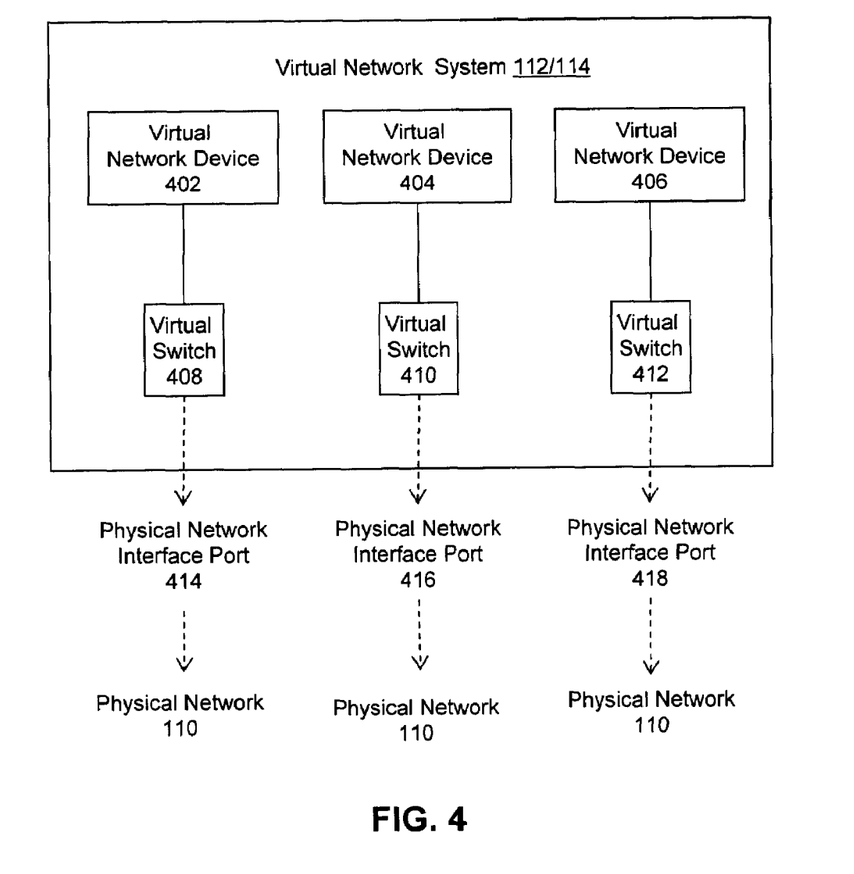
FIG. 4 is a block diagram representation of an example of a virtual network system that may be identified for modification by one embodiment of a virtual network device identification module.

Referring to FIG. 4, a block diagram representation of an example of a virtual network system 112, 114 that may be identified for modification by one embodiment of a virtual network device identification module 302 is shown. The example virtual network system 112, 114 includes first, second and third virtual network devices 402, 404, 406 communicatively coupled to first, second and third virtual switches 408, 410, 412, respectively. The first, second and third virtual switches 408, 410, 412 are communicatively to first, second and third physical network interface ports 414, 416, 418, respectively. The first, second and third physical network interface ports 414, 416, 418 are operable to be communicatively coupled to the physical network 110. In other words, the first virtual network device 402 is communicatively coupled to the physical network 110 via the virtual network switch 408 and the physical network interface port 414. The second virtual network device 404 is communicatively coupled to the physical network 110 via the virtual network switch 410 and the physical network interface port 416. The third virtual network device 406 is communicatively coupled to the physical network 110 via the virtual network switch 412 and the physical network interface port 418.

In one embodiment, the first, second and third physical network interface ports 414, 416, 418 are integral with the physical network device 102, 104. In one embodiment, a physical network switch includes the first, second and third physical network interface ports 414, 416, 418 and the physical network device 102, 104 is communicatively coupled to the physical network switch. In one embodiment, a single physical network interface port operates to communicatively couple the virtual network system 112, 114 to the physical network system 110 thereby communicatively coupling the first, second and third virtual network devices 402, 404, 406 to the physical network system 110.

Referring back to FIG. 3, the virtual network device identification module 302 identifies a virtual network system 112, 114 such as the example virtual network system 112, 114 defined in FIG. 4. The virtual network device identification module 302 then identifies the virtual network devices 402, 404, 406 such as for example the virtual network devices 402, 404, 406 illustrated in the example virtual network system 112, 114.

The virtual network appliance definition module 304 defines a virtual network appliance 1 18, 120 within the physical network device 102, 104 in accordance with user provided specifications. In one embodiment, the virtual network appliance definition module 304 provides a user with the option of selecting one of a plurality of pre-defined virtual network appliances 118, 120 for integration into the selected virtual network system 112, 114. Examples of virtual network appliances 118, 120 that may be integrated into a virtual network system 112, 114 using the virtual network appliance module 212 include but are not limited to a virtual network traffic router, a virtual network switch, a virtual network access point device. In one embodiment, the virtual network appliance module 212 defines virtual network appliances 118, 120 that are operate to enforce one or more network policies within the virtual network system 112, 114. The virtual network appliance module 212 may be used to define one or more virtual network appliances 118, 120 that are capable of performing one or more of the following network operations: network access control operations, network management operations, network traffic monitoring operations, network reporting operations, a network traffic routing operations, network throttling operations, network quality service operations, network load balancing operations, network traffic filtering operations, network traffic restriction operations, network deep packet inspection operations, network access control list implementation operations, network protocol filtering operations and network media access control (MAC) address filtering operations.

In one embodiment, the virtual network appliance 118, 120 may be configured to manage all network traffic from one or more virtual network devices within the virtual network system 112, 114. In one embodiment, the virtual network appliance 118, 120 may be configured to manage all network traffic to and from one or more virtual network devices within the virtual network system 112, 114. In one embodiment, the virtual network appliance 118, 120 may be configured to manage selected network traffic to one or more virtual network devices within the virtual network system 112, 114. In one embodiment, the virtual network appliance 118, 120 may be configured to manage selected network traffic from one or more virtual network devices within the virtual network system 112, 114. In one embodiment, a virtual network appliance 118, 120 may be configured to manage selected network traffic to and from one or more virtual network devices within the virtual network system 112, 114.

Figure 5:
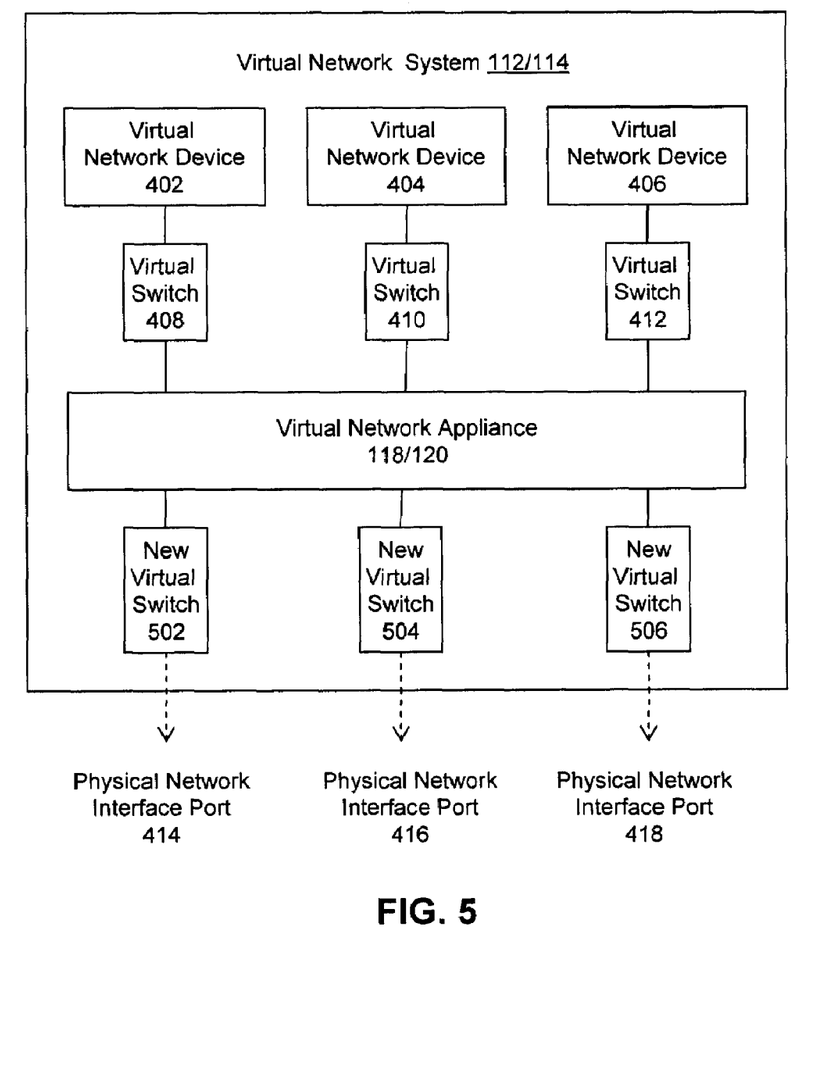
FIG. 5 is a block diagram representation of an example of a virtual network system including a plurality of virtual network devices and one embodiment of a virtual network appliance.

The virtual network appliance integration module 306 generally integrates the virtual network appliance 118, 120 defined by the virtual network appliance definition module 304 into the virtual network system 112, 114 in accordance with user supplied specifications. The virtual network appliance integration module 306 receives data regarding the identities of the virtual network devices 402, 404, 406 that have been targeted to have their network traffic managed by a virtual network appliance 118, 120. The operation of the virtual network appliance integration module 306 will be described with reference to FIG. 5. FIG. 5 is a block diagram representation of an example of a virtual network system 112, 114 including a plurality of virtual network devices 402, 404, 406 and one embodiment of a virtual network appliance 118, 120 that has been integrated into the virtual network system 112, 114.

In one embodiment, the virtual network appliance integration module 306 identifies the first, second and third virtual switches 408, 410, 412 communicatively coupling the first, second and third virtual network devices 402, 404, 406 to the first, second and third physical network interface ports 414, 416, 418, respectively. The virtual network appliance integration module 306 decouples the first, second and third virtual switches 408, 410, 412 from the first, second and third physical network interface ports 414, 416, 418, respectively. The virtual network appliance integration module 306 then defines another set of first, second and third new virtual switches 502, 504, 506 and communicatively couples the first, second and third new virtual switches 502, 504, 506 to the first, second and third physical network interface ports 414, 416, 418, respectively.

The virtual network appliance integration module 306 communicatively couples the first virtual switch 408 to the virtual network appliance 118, 120 and the virtual network appliance 118, 120 to the first new virtual switch 502, thereby establishing communicative coupling between the first virtual network device 402 and the physical network system 110 via the first virtual switch 408, the virtual network appliance 118, 120, the first new virtual switch 502 and the first physical network interface port 414. In one embodiment, all network traffic to and from the first virtual network device 402 passes through the virtual network appliance 118, 120 thereby enabling the virtual network appliance 118, 120 to manage network traffic associated with the first virtual network device 402.

Similarly, the virtual network appliance integration module 306 communicatively couples the second virtual switch 410 to the virtual network appliance 118, 120 and the virtual network appliance 118, 120 to the second new virtual switch 504, thereby establishing communicative coupling between the second virtual network device 404 and the physical network system 110 via the second virtual switch 410, the virtual network appliance 118, 120, the second new virtual switch 504 and the second physical network interface port 416. The virtual network appliance integration module 306 communicatively couples the third virtual switch 412 to the virtual network appliance 118, 120 and the virtual network appliance 118, 120 to the third new virtual switch 506, thereby establishing communicative coupling between the third virtual network device 406 and the physical network system 110 via the third virtual switch 412, the virtual network appliance 118, 120, the third new virtual switch 506 and the third physical network interface port 418. In one embodiment, all network traffic to and from the first and second virtual network devices 404, 406 pass through the virtual network appliance 118, 120 thereby enabling the virtual network appliance 118, 120 to manage network traffic associated with the second and third virtual network devices 404, 406.

In should be noted that while one virtual network configuration for integrating a virtual network appliance 118, 120 into a virtual network system 112, 114 has been described, alternative virtual network configurations may be used to integrate a virtual network appliance 118, 120 into a virtual network system 112, 114 in a manner that will enable the virtual network appliance to manage network traffic associated with one or more virtual network devices 402, 404, 406.

Figure 6:
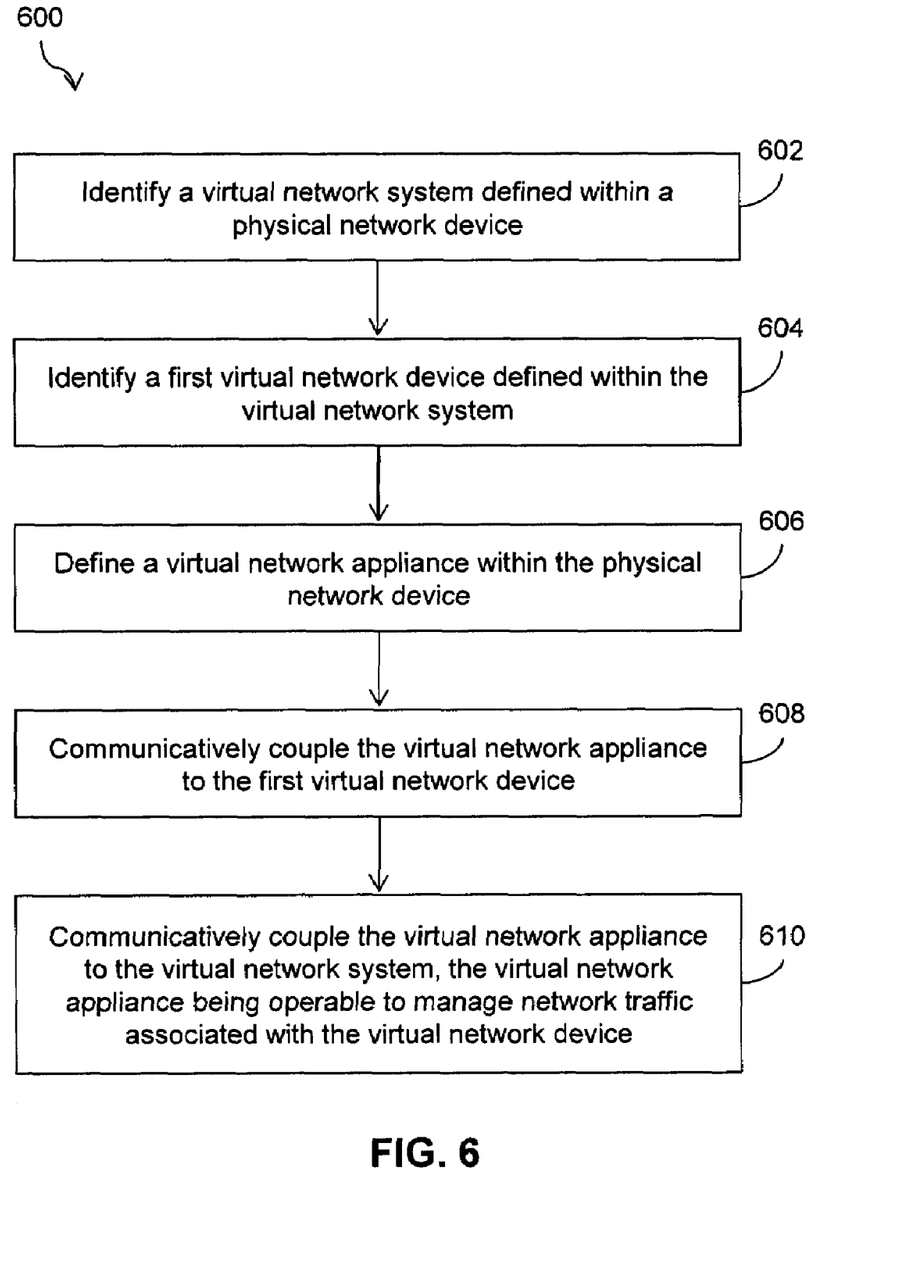
FIG. 6 is a flowchart representation of one embodiment of managing network traffic associated with a virtual network device.

Referring to FIG. 6 a flowchart representation of one embodiment of a method 600 of managing network traffic within a virtual network system 112, 114 is shown. A virtual network system 112, 114 defined within a physical network device 102, 104 is identified at step 602. A first virtual network device 402 defined within the virtual network system 112, 114 is identified at step 604. A virtual network appliance 118, 120 is defined within the physical network device 102, 104 at step 606. The virtual network appliance 118, 120 is communicatively coupled to the first virtual network device 402 at step 608. The virtual network appliance 118, 120 is communicatively coupled to the virtual network system 112, 114 at step 610. The virtual network appliance 118, 120 is operable to manage network traffic associated with the first virtual network device 402. While the steps in the method 600 have been described in a particular order, the steps may be performed in a different order or additional steps may be performed in addition to the described steps.

In one embodiment, a computer readable medium stores a computer executable program for managing network traffic within a virtual network system 112, 114. The computer readable medium includes computer readable code for identifying a virtual network system 112, 114 defined within a physical network device 102, 104, computer readable code for identifying a first virtual network device 402 defined within the virtual network system 112, 114, computer readable code for defining a virtual network appliance 118, 120 within the physical network device 102, 104, computer readable code for communicatively coupling the virtual network appliance 118, 120 to the first virtual network device 402, and computer readable code for communicatively coupling the virtual network appliance 118, 120 to the virtual network system 112, 114, the virtual network appliance 118, 120 being operable to manage network traffic associated with the first virtual network device 402.

In one embodiment a system for managing network traffic within a virtual network system 112, 114 includes a virtual network device identification module 302, a virtual network appliance definition module 304 and a virtual network appliance integration module 306. The virtual network device identification module 302 is operable to identify a virtual network system 112, 114 defined within a physical network device 102, 104 and to identify a first virtual network device 402 defined within the virtual network system 112, 114. The virtual network appliance definition module 304 is operable to define a virtual network appliance 118, 120 within the physical network device 102, 104. The virtual network appliance integration module 306 is operable to communicatively couple the virtual network appliance 118, 120 to the first virtual network device 402 and to communicatively couple the virtual network appliance 118, 120 to the virtual network system 112, 114, the virtual network appliance 118, 120 being operable to manage network traffic associated with the first virtual network device 402.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A method of managing network traffic within a virtual network system, the method comprising:
    identifying a virtual network system defined within a physical network device;
    identifying a first virtual network device defined within the virtual network system;
    defining a virtual network appliance within the physical network device;
    communicatively coupling the virtual network appliance to the first virtual network device;
    communicatively coupling the virtual network appliance to the virtual network system by defining a virtual switch within the physical network device, communicatively coupling the virtual switch to the first virtual network device, and communicatively coupling the virtual switch to the virtual network appliance, the virtual network appliance being operable to manage network traffic associated with the first virtual network device; and
    communicatively coupling the virtual network appliance to a physical network interface port thereby communicatively coupling the first virtual network device to a physical network system via the virtual network appliance, wherein communicatively coupling the virtual network appliance to the physical network interface port comprises communicatively coupling a further virtual switch to the physical network interface port.

2. The method of claim 1, wherein defining a virtual network appliance within the physical network device comprises defining a virtual network appliance operable to manage network traffic selected from a group consisting of all network traffic to the first virtual network device, all network traffic from the first virtual network device, all network traffic to and from the first virtual network device, selected network traffic to the first virtual network device, selected network traffic from the first virtual network device and selected network traffic to and from the first virtual network device.

3. The method of claim 1, wherein communicatively coupling the virtual network appliance to a physical network interface port comprises communicatively coupling the virtual network appliance to a physical network interface port selected from a group consisting of a physical network interface port integrated with the physical network device, a physical network interface port communicatively coupled to the physical network device, a physical network interface port operable to communicatively couple the virtual network system to the physical network system and a physical interface port operable to communicatively couple the first virtual network device to the physical network system.

4. The method of claim 1, further comprising:
    identifying a plurality of virtual network devices within the virtual network system, the plurality of virtual network devices including the first virtual network device; and
    communicatively coupling the virtual network appliance to each of the identified plurality of virtual network devices, the virtual network appliance being operable to manage network traffic associated with each of the plurality of virtual network devices.

5. The method of claim 1, wherein defining a virtual network appliance within the physical network device comprises defining a virtual network appliance selected from a group consisting of a virtual network traffic router, a virtual network switch and a virtual network access point device.

6. The method of claim 1, wherein defining a virtual network appliance within the physical network device comprises defining a virtual network appliance operable to perform a network operation selected from a group consisting a network policy enforcement operation, an access control operation, a network management operation, a network traffic monitoring operation, a network reporting operation, a network traffic routing operation, a network traffic throttling operation, a network quality service operation, a network load balancing operation, a network traffic filtering operation, a network traffic restriction operation, a network deep packet inspection operation, a network access control list implementation operation, a network protocol filtering operations and a network media access control (MAC) address filtering operation.

7. A non-transitory computer readable medium for storing a computer executable program for managing network traffic within a virtual network system, the computer readable medium comprising:
    computer readable code for identifying a virtual network system defined within a physical network device;
    computer readable code for identifying a first virtual network device defined within the virtual network system;
    computer readable code for defining a virtual network appliance within the physical network device;
    computer readable code for communicatively coupling the virtual network appliance to the first virtual network device;
    computer readable code for communicatively coupling the virtual network appliance to the virtual network system comprises computer readable code for defining a virtual switch within the physical network device, computer readable code for communicatively coupling the virtual switch to the first virtual network device, and computer readable code for communicatively coupling the virtual switch to the virtual network appliance, the virtual network appliance being operable to manage network traffic associated with the first virtual network device; and
    computer readable code for communicatively coupling the virtual network appliance to a physical network interface port thereby communicatively coupling the first virtual network device to a physical network system via the virtual network appliance, wherein the computer readable code for communicatively coupling the virtual network appliance to the physical network interface port comprises computer readable code for communicatively coupling a further virtual switch to the physical network interface port.

8. The computer readable medium of claim 7, wherein the computer readable code for defining a virtual network appliance within the physical network device comprises computer readable code for defining a virtual network appliance operable to manage network traffic selected from a group consisting of all network traffic to the first virtual network device, all network traffic from the first virtual network device, all network traffic to and from the first virtual network device, selected network traffic to the first virtual network device, selected network traffic from the first virtual network device and selected network traffic to and from the first virtual network device.

9. The computer readable medium of claim 7, wherein the computer readable code for communicatively coupling the virtual network appliance to a physical network interface port comprises computer readable code for communicatively coupling the virtual network appliance to a physical network interface port selected from a group consisting of a physical network interface port integrated with the physical network device, a physical network interface port communicatively coupled to the physical network device, a physical network interface port operable to communicatively couple the virtual network system to the physical network system and a physical interface port operable to communicatively couple the first virtual network device to the physical network system.

10. The computer readable medium of claim 7, further comprising:
   computer readable code for identifying a plurality of virtual network devices within the virtual network system, the plurality of virtual network devices including the first virtual network device; and
   computer readable code for communicatively coupling the virtual network appliance to each of the identified plurality of virtual network devices, the virtual network appliance being operable to manage network traffic associated with each of the plurality of virtual network devices.

11. The computer readable medium of claim 7, wherein the computer readable code for defining a virtual network appliance within the physical network device comprises computer readable code for defining a virtual network appliance selected from a group consisting of a virtual network traffic router, a virtual network switch and a virtual network access point device.

12. The computer readable medium of claim 7, wherein the computer readable code for defining a virtual network appliance within the physical network device comprises computer readable code for defining a virtual network appliance operable to perform a network operation selected from a group consisting a network policy enforcement operation, an access control operation, a network management operation, a network traffic monitoring operation, a network reporting operation, a network traffic routing operation, a network traffic throttling operation, a network quality service operation, a network load balancing operation, a network traffic filtering operation, a network traffic restriction operation, a network deep packet inspection operation, a network access control list implementation operation, a network protocol filtering operations and a network media access control (MAC) address filtering operation.

13. A system for managing network traffic within a virtual network system comprising:
   a virtual network device identification module operable to identify a virtual network system defined within a physical network device and to identify a first virtual network device defined within the virtual network system;
   a virtual network appliance definition module operable to define a virtual network appliance within the physical network device;
   a virtual network appliance integration module operable to communicatively couple the virtual network appliance to the first virtual network device and to communicatively couple the virtual network appliance to the virtual network system, the virtual network appliance being operable to manage network traffic associated with the first virtual network device, the virtual network appliance integration module operable to communicatively couple the virtual network appliance to the virtual network system by defining a virtual switch within the physical network device, communicatively coupling the virtual switch to the first virtual network device, and communicatively coupling the virtual switch to the virtual network appliance, the virtual network appliance integration module operable to communicatively couple the virtual network appliance to a physical network interface port thereby communicatively coupling the first virtual network device to a physical network system via the virtual network appliance, wherein communicatively coupling the virtual network appliance to the physical network interface port comprises communicatively coupling a further virtual switch to the physical network interface port; and
   a processing unit implementing at least one of the virtual network device identification module, the virtual network appliance definition module, and the virtual network appliance integration module.

14. The system of claim 13, wherein the virtual network appliance is operable to perform a network operation selected from a group consisting a network policy enforcement operation, an access control operation, a network management operation, a network traffic monitoring operation, a network reporting operation, a network traffic routing operation, a network traffic throttling operation, a network quality service operation, a network load balancing operation, a network traffic filtering operation, a network traffic restriction operation, a network deep packet inspection operation, a network access control list implementation operation, a network protocol filtering operations and a network media access control (MAC) address filtering operation.

* * * * *